3,495,975
EXTRACTION OF PROTACTINIUM FROM MOLTEN SALT MIXTURES INTO BISMUTH-TIN SOLUTION
Warren R. Grimes, Oak Ridge, David M. Moulton, Knoxville, and James H. Shaffer, Oak Ridge, Tenn., assignors to the United States of America as represented by the United States Atomic Energy Commission
No Drawing. Filed Nov. 8, 1968, Ser. No. 774,507
Int. Cl. C22b *61/04, 3/00*
U.S. Cl. 75—84.1    4 Claims

ABSTRACT OF THE DISCLOSURE

An improved process for reprocessing spent molten fluoride salts containing iron impurities of bred-in protactinium values is provided comprising the step of contacting at a temperature of about 650° C. said salt with a bismuth-tin metal solution containing minor amounts of a metal reductant.

BACKGROUND OF THE INVENTION

This invention relates to reprocessing methods for purifying bred-in protactinium values from molten salt reactor fluids and more particularly to an improved reductive liquid-liquid extraction process for removing protactinium values from a molten fluoride blanket salt containing iron impurities. The invention described herein was made in the course of, or under, a contract with the United States Atomic Energy Commission.

Reductive extraction as a means for removing bred-in protactinium values from molten salt fluids has recently been demonstrated. In such a process a molten salt fluid containing dissolved protactinium values is contacted countercurrently with a bismuth extractant which contains a minor quantity of a reductant metal such as thorium. The protactinium values, as $PaF_4$, are reduced to metal and simultaneously caused to transfer across the salt-metal interface into the bismuth phase and dissolve therein. While this process provided essentially complete removal of all of the protactinium values from the salt phase, some difficulty was experienced in causing the reduced protactinium metal to remain dissolved in the bismuth metal phase. This difficulty was believed attributable to the protactinium having a great affinity for particles of metallic iron, which is normally present in from 1–200 p.p.m. in these molten salts as an impurity, and being retained on the iron surfaces in the system. One process, described in Ser. No. 644,466, filed on June 6, 1967, in the names of Warren R. Grimes et al., now Patent No. 3,395,991 issued August 6, 1968, for "Recovery of Molten Fluoride Salts," took advantage of this affinity by adsorbing the protactinium on a high surface area iron such as steel wool. While that process was quite satisfactory in removing the protactinium values from a spent molten salt fluid it is desirable in chemical processing to provide a separation means wherein the protactinium values can be transferred directly from one liquid phase to another without the difficulty of dissolving some solid intermediate phase material before recovery of the protactinium can be accomplished.

SUMMARY OF THE INVENTION

The object of this invention, which is to provide a direct and efficient method for removing protactinium values from molten salt fluids containing iron impurities, was achieved by the discovery that a small addition of tin to the bismuth solution facilitated the transfer of the reduced protactinium values into the bismuth phase, providing a good material balance in the two phases. Where a 1.78 kg. batch of blanket salt, LiF—BeF$_2$—ThF$_4$ (73–2–25 mole percent) containing 1 millicurie of protactinium-233 was contacted with 2.98 kg. of bismuth containing 0.410 kg. of tin, better than 92% of the protactinium activity was found in a recovery salt which was used to back extract the removed protactinium values from the bismuth-tin metal solution.

DESCRIPTION OF THE PREFERRED EMBODIMENTS

In the practice of the invention a spent molten salt fluid, such as a LiF—BeF$_2$—Th$_4$ (73–2–25 mole percent blanket composition), is contacted either batchwise or in a continuous operation with a bismuth-tin metal stream containing a quantity of thorium which serves as a reductant. The protactinium values are simultaneously reduced to protactinium metal by the thorium reductant and extracted into the bismuth-tin metal phase. While applicants do not wish to be bound by a rigid theory it is postulated, in view of the discovered great affinity of the protactinium values for iron, that iron, being more soluble in tin than in bismuth, then becomes soluble in the bismuth-tin solution and as a result provides the necessary solubility to transfer the reduced protactinium from the molten salt to the bismuth phase. Accordingly, a sufficient amount of tin should be added to the bismuth stream to insure complete dissolution of iron at a rate equivalent to its reduction from the salt phase. While no precise correlation between the amount of tin to the amount of iron reduced from the molten salt has been established, 0.410 kg. of tin dissolved in 2.98 kg. of bismuth was quite suitable on a laboratory scale to remove better than 92% of the protactinium (1 millicurie of $^{233}$Pa) from 1.78 kg. of the hereinbefore mentioned molten salt liquid, which contained approximately 200 p.p.m. iron.

After contacting the blanket molten salt fluid with the bismuth-tin solution the reductant, which may comprise lithium or thorium, is added to the molten salt fluid to effect a reduction of the protactinium values to the metal state. In one embodiment the molten blanket salt is provided in one cylinder which is connected to a second cylinder by a common reservoir of bismuth-tin solution. A recovery salt is provided in the second cylinder; the respective molten salts float on the metal solution. In this embodiment the reductant is then added to the molten blanket salt while hydrogen fluoride admixed with hydrogen is bubbled through the recovery salt. The reduced protactinium metal is thus extracted into the bismuth-tin phase and oxidized there to the fluoride, transferring across the metal-salt interface into the recovery molten salt. The extracted protactinium values may then be stored outside the reactor environment in the recovery salt, awaiting their decay to uranium-233 which in turn may be recovered by fluoride volatility processes.

The mechanism for the reductive extraction of protactinium by thorium in the salt-bismuth system can be described by the equilibria

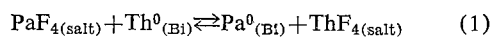    (1)

Similarly, the reduction of iron by thorium can be expressed by the equation

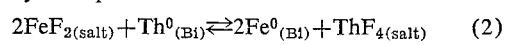    (2)

The solubility of thorium in bismuth at 650° C. is low, <5000 p.p.m., and that of iron is bismuth is much lower, <100 p.p.m. It will be apparent from Equation 2 that the reduction of iron impurities fom the salt mixture in quantities in excess of its solubility in bismuth will result in the formation of solid particles containing iron. The process of Equation 1 which follows that of Equation 2 would lead to the deposition of protactinium on the solid particles. Therefore, if the deposition of protactinium-rich solids are to be avoided in the reductive extraction process, the rate at which iron is reduced, hence the rate of reductant addition, should not exceed the capacity of iron and thorium solubility in bismuth. Having met these conditions, the distribution of protactinium between the two liquid phases will be proportional to the concentration of thorium dissolved in bismuth. By increasing the solubility of iron in bismuth, higher thorium values in bismuth can be achieved and therefore higher values for the protactinium is bismuth can be realized.

The temperature at which the extraction process is conducted may vary over a wide range. In general both the bismuth-tin solution and the blanket molten salt should be maintained at a temperature above the liquidus temperature of the particular salt composition employed. To insure a safe margin for process control, it is preferred that both streams be maintained at least 50° C. above the liquids temperature of the molten salt. Higher temperatures may increase the corrosion rate of container materials and the complexity of operation; temperatures in excess of about 900° C. are not recommended. For a typical blanket salt composition of LiF—$BeF_2$—$ThF_4$ (73–2–25 mole percent) a preferred reprocessing temperature range is 650°–750° C.

The following example is given to illustrate the present invention in greater detail.

Example

To demonstrate the feasibility of removing bred-in protactinium-233 from a blanket molten salt composition, 2.98 kg. of bismuth containing 0.410 kg. of tin was placed in a graphite cylinder (4½₂ in. ID by 14 in. length) within a stainless steel vessel (4″ IPS pipe x 16⅛ in. length) which was divided into two compartments by a second eccentric graphite cylinder (1¾ in. ID x 15 in. length) suspended from the top to within ½ in. of the bottom. A charge of 1.78 kg. of simulated blanket salt, LiF—$BeF_2$—$THF_4$ (73–2–25 mole percent) containing 1 millicurie of protactinium-233 was placed in the outer compartment and approximately 0.533 kg. of LiF—$BeF_2$ (60–40 mole percent) recovery salt was placed in the inner compartment, the respective molten salt fluids floating on the molten bismuth-tin solution. The respective fluids were maintained at a temperature of 650° C.

Thorium metal chips (20 grams) were then added in 5-gram increments to the blanket salt while hydrogen fluoride (10 volume percent in hydrogen) was bubbled through the recovery salt at a hydrogen flow rate of about one-half liter per minute. Samples of all three phases were taken in graphite dip samples after each thorium addition and hydrofluorination treatment period. These samples were analyzed radiochemically by measuring the intensity of the 310 kilovolt gamma ray on a single channel gamma spectrometer. The results are given in the following table.

TABLE

| | $^{233}$Pa in blanket salt, percent | $^{233}$Pa in bismuth, percent | $^{233}$Pa in recovery salt, percent |
|---|---|---|---|
| Thorium added, grams: | | | |
| 0 | 100 | 0 | 0 |
| 5 | 78 | 17 | 1 |
| 10 | 37 | 1 | 54 |
| 15 | 25 | 2 | 83 |
| 20 | 8 | 2 | 93 |

Overall material balances of ±10% are within the accuracy of the experimental method. It may be seen that 93% of the protactinium-233 activity was found in the recovery salt mixture, 2% was in the molten metal phase, and 8% remained in the simulated blanket salt.

It should be apparent that the subject process is useful in removing bred-in protactinium from any molten salt fluid which contains minor iron impurities. Thus while the process has been particularly described hereinbefore with reference to removing protactinium-233 from a blanket salt composition, it will be apparent that single region core salts, such as described in Ser. No. 733,843, filed on June 3, 1968, in the names of Edward S. Bettis et al. for "Single Fluid Molten Salt Nuclear Breeder Reactor," may be equally reprocessed of bred-in protactinium values by this reductive extraction process using a bismuth-tin metal extractant containing minor amounts of a metal reductant. Too, this method is applicable to a wide range of molten fluoride salt mixtures useful as fuels for molten salt breeder reactors. Non-limiting examples of these salt compositions include fluorides of the alkali metals, such as potassium fluoride, sodium fluoride, and lithium fluoride; and beryllium fluoride as molten salt mixtures with thorium and uranium tetrafluoride. Accordingly, the present invention is not intended to be limited to the specific embodiments herein given except as defined in the appended claims.

What is claimed is:

1. In a method for reprocessing molten metallic fluoride salts selected from lithium fluoride, sodium fluoride, potassium fluoride, beryllium fluoride, thorium tetrafluoride and uranium tetrafluoride containing dissolved protactinium values along with iron impurities wherein said salts are contacted with a molten metal solution of bismuth and a minor quantity of a metal reductant to reduce said protactinium values to metal and extract same from said salts, the improvement comprising incorporating a quantity of tin in said metal solution at a concentration sufficient to extract said iron into said bismuth as said iron is reduced.

2. The method of claim 1 wherein said molten metallic fluoride salt is a blanket composition of LiF—$BeF_2$—$ThF_4$ (73–2–25 mole percent) said metal reductant is thorium and said tin is provided in a concentration of 12 weight percent in bismuth.

3. The method of claim 1 wherein said extraction process is conducted at 650° C.

4. The method of claim 1 wherein said protactinium values comprise 25 to 250 p.p.m. protactinium-233.

References Cited

UNITED STATES PATENTS 3,395,991   8/1968   Grimes et al.  23—325

OTHER REFERENCES

Shaffer et al.: Removal of Protactinium From Molten Fluorides by Reduction Processes, March 1967, pp. 36–38, ORNL 4076.

Barton et al.: Protactinium Studies in High Alpha Molten-Salt Laboratory, March 1967, pp. 39–41, ORNL 4076.

CARL D. QUARFORTH, Primary Examiner

MELVIN J. SCOLNICK, Assistant Examiner

U.S. Cl. X.R.

23—325